(12) United States Patent
Shinedling et al.

(10) Patent No.: US 7,661,753 B2
(45) Date of Patent: Feb. 16, 2010

(54) ADJUSTABLE AERODYNAMIC SPLITTER

(75) Inventors: Michael Shinedling, Oxford, MI (US); Ray Ayala, Royal oak, MI (US); Matt Bejnarowicz, Farmington Hills, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 184 days.

(21) Appl. No.: 11/934,806

(22) Filed: Nov. 5, 2007

(65) Prior Publication Data

US 2009/0115221 A1 May 7, 2009

(51) Int. Cl.
*B60J 9/04* (2006.01)
(52) U.S. Cl. ................................... 296/180.5
(58) Field of Classification Search .... 296/180.1–180.5
See application file for complete search history.

(56) References Cited

U.S. PATENT DOCUMENTS

| | | | | |
|---|---|---|---|---|
| 4,159,140 A * | 6/1979 | Chabot et al. | ............ | 296/180.5 |
| 4,951,994 A * | 8/1990 | Miwa | ....................... | 296/180.1 |
| 4,976,489 A * | 12/1990 | Lovelace | .................. | 296/180.1 |
| 5,692,796 A * | 12/1997 | Yamamoto et al. | ........ | 296/180.1 |
| 6,079,769 A * | 6/2000 | Fannin et al. | ............. | 296/180.1 |
| 2003/0234555 A1* | 12/2003 | Hojna | ....................... | 296/180.1 |
| 2004/0130182 A1* | 7/2004 | Bangle et al. | ............. | 296/180.5 |
| 2007/0182207 A1* | 8/2007 | Nakaya | ..................... | 296/180.1 |
| 2007/0216194 A1* | 9/2007 | Rober et al. | .............. | 296/180.1 |
| 2009/0085371 A1* | 4/2009 | Nagahama | ................ | 296/180.5 |

* cited by examiner

*Primary Examiner*—H Gutman
(74) *Attorney, Agent, or Firm*—Ralph E. Smith

(57) ABSTRACT

An adjustable aerodynamic splitter for a motor vehicle having a rearward flexible segment for attachment to the vehicle body and a forward more rigid segment, wherein the forward segment's leading edge is arranged for selectively attaching thereto an extension strip of a desired width, and at least one pair of adjustable length linkages attaching the splitter to the vehicle body near the leading edge, spaced symmetrically about the vehicle centerline, and arranged to raise or lower the leading edge in response to adjustment of the linkages' length.

20 Claims, 6 Drawing Sheets

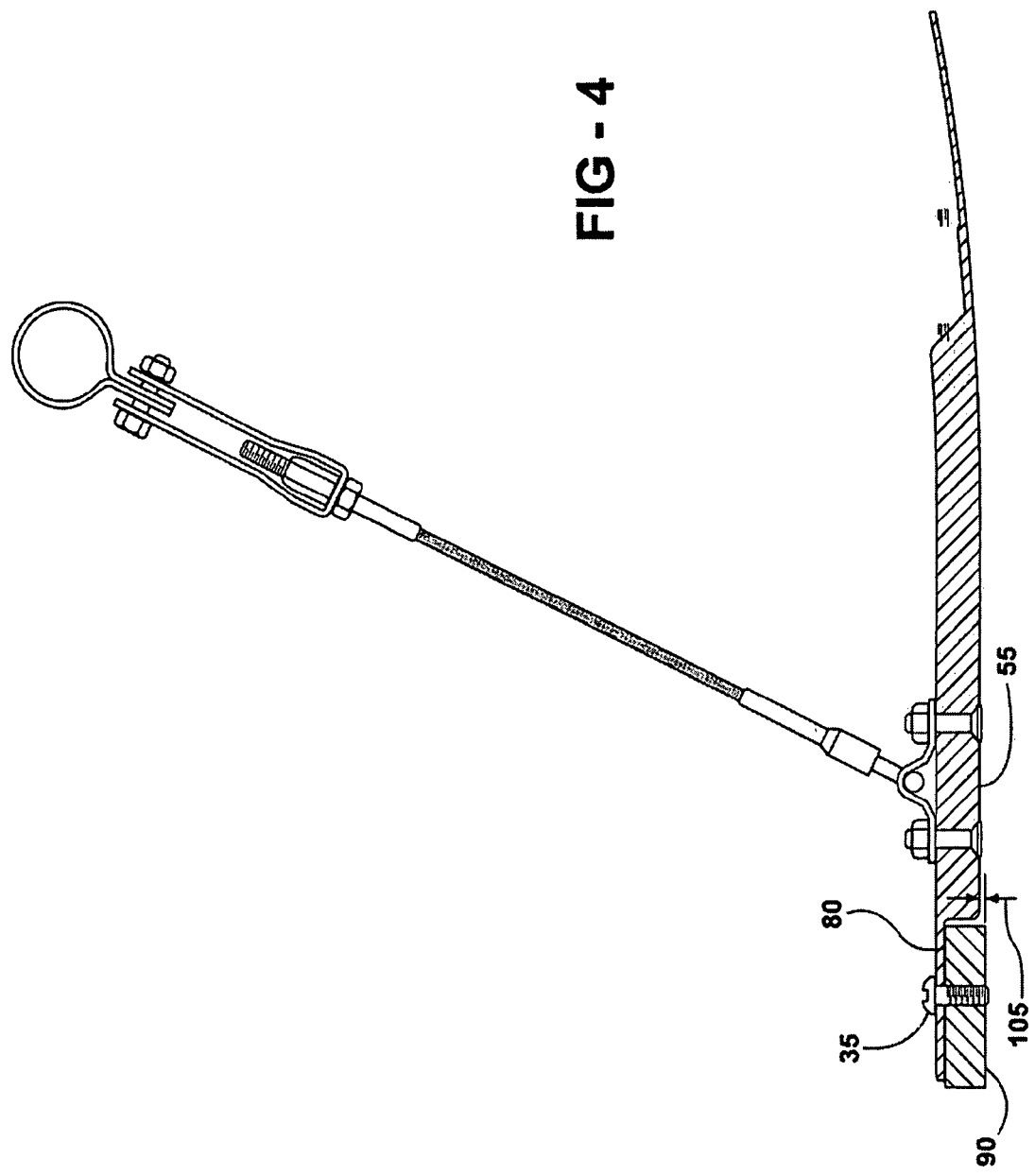

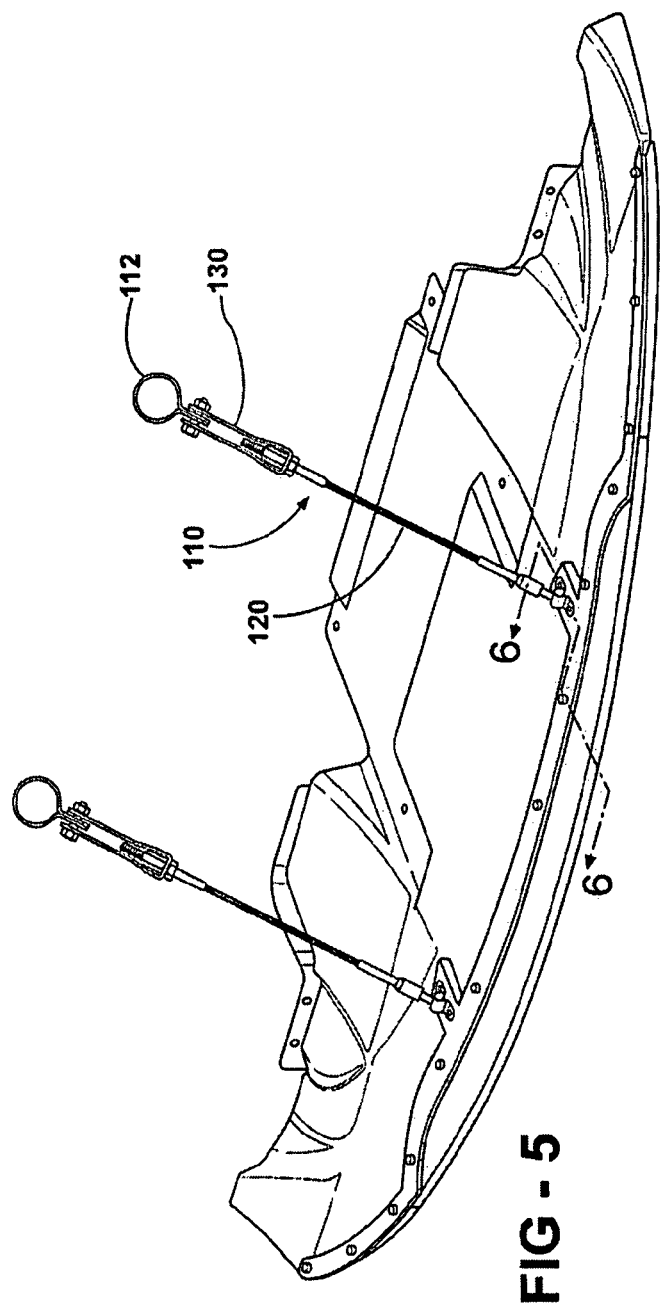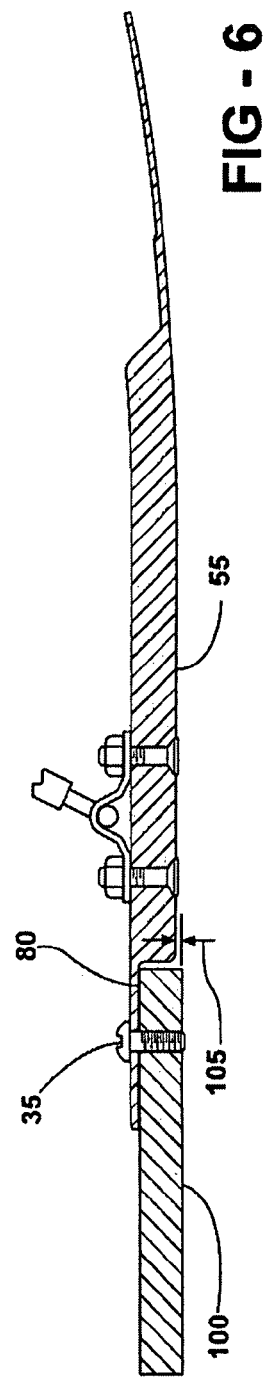

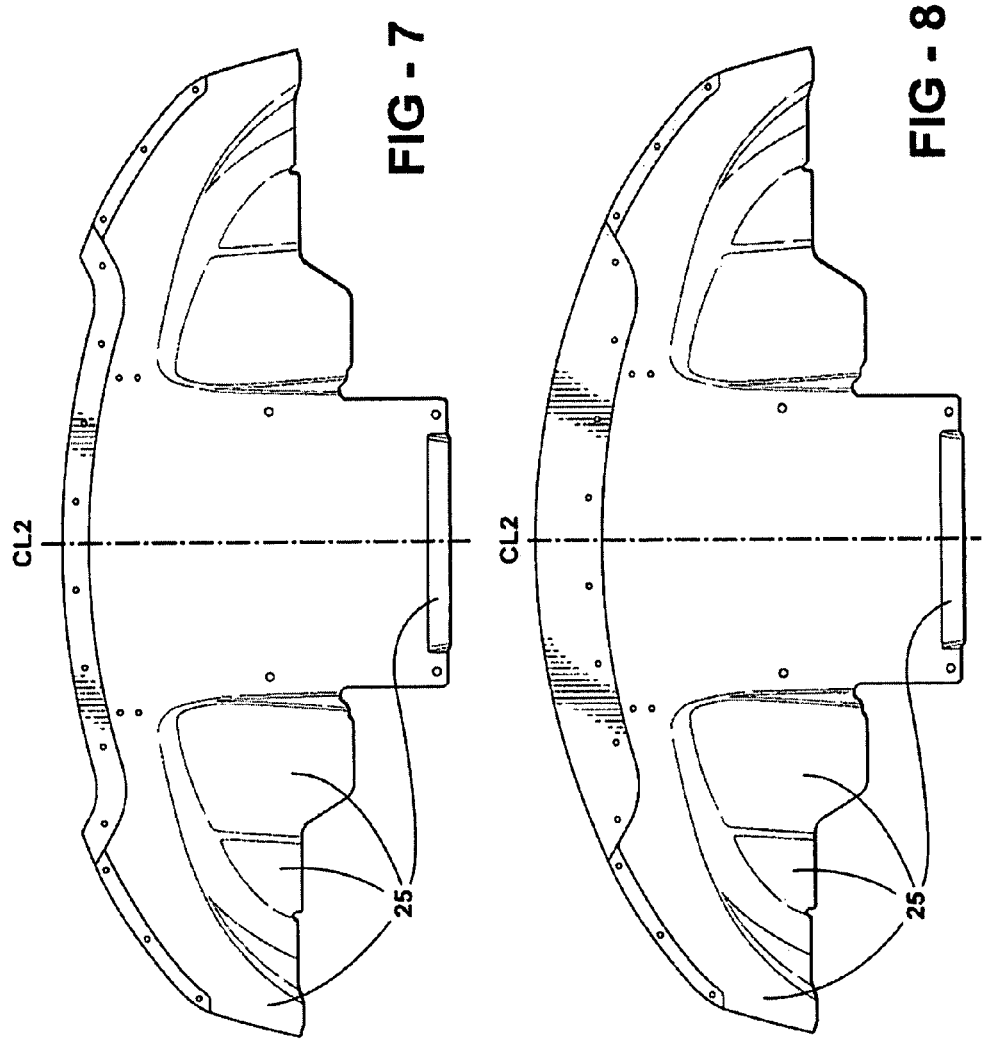

ADJUSTABLE AERODYNAMIC SPLITTER

FIELD OF THE INVENTION

The present invention relates to an aerodynamic front splitter for a motor vehicle, and, more particularly, to an adjustable, i.e. easily reconfigured aerodynamic splitter mountable on the frontal area of a motor vehicle.

BACKGROUND OF THE INVENTION

Aerodynamic considerations are at the forefront of motor vehicle body design, and have spawned a variety of external appendages to enhance vehicle sleekness. Effective airflow management over a vehicle body can be critical in meeting functional demands for quietness, fuel efficiency and safety of passenger type vehicles, as well as for enhanced vehicle control and improved speed for sporting and competition type vehicles.

Among the most common aerodynamic devices utilized in the automotive industry for a vehicle's front end design/configuration are a chin spoiler, an air dam and a front splitter. The structural differences between the three devices are determined by the way they can manage the airflow. A chin spoiler generally acts like a wing by redirecting airflow incident on the vehicle's front end, and thereby creating a more aerodynamically efficient vehicle body. Generally, however, a chin spoiler is not efficient in reducing front end lift, i.e. where at higher road speeds incident airflow creates a high pressure zone under the vehicle's front substructure. Such a high pressure zone tends to lift the vehicle, thereby reducing pressure on front tires, which in turn negatively impacts the vehicle's road grip. An air dam, on the other hand, generally blocks incident airflow from following a flow path under the vehicle body, and is therefore usually effective in reducing drag. An air dam, however, tends to generate lift, and is therefore detrimental to high speed handling and control of a vehicle. A front splitter combines the functionality of a spoiler and an air dam by controlling airflow around the vehicle and limiting front end lift. Depending on its positioning, a front splitter can limit how much air is directed under the vehicle by slicing through the incoming air stream and directing a portion of the airflow over the vehicle body. It is critical for a splitter's effectiveness that the airflow being directed to the vehicle's undercarriage remains laminar, i.e. smooth. Providing a laminar undercarriage air flow reduces drag and therefore allows the vehicle's aerodynamic efficiency to remain generally unaffected.

Functionally, a front splitter can be effective at higher road speeds in not only preventing front end lift, but also in providing an aerodynamic down force on the vehicle's front wheels. The overall aerodynamic effect is created usually by slicing the incident air flow by the splitter's forward portion and subsequent management and control of the undercarriage air stream by the splitter's underbody portion. The resultant dynamic down force generally helps the driver to retain control of the vehicle at higher road speeds. This down force is highly desirable in sports and racing vehicles, where the aerodynamic down force increases front tire grip in corners, enhances driver control and allows for faster race track lap times. Generally, for effective performance, a splitter's forward portion must be relatively rigid, while the undercarriage portion may remain somewhat flexible. A splitter providing the desired down force is usually developed empirically through design and subsequent testing of an entire assembly, including the splitter's forward and undercarriage portions, on an actual vehicle. Since a front splitter is typically associated with competition-type vehicles, such a device can be utilized to give conventional street vehicles a fashionably sporting appearance. For a conventional road going vehicle, however, the splitter design and its positioning are of necessity compromised toward operation on public roads, making it more of a "street type" device.

For operation on public roads a "street type" splitter must be configured for sufficient ground clearance to accommodate suspension and body movement over dips and potholes, which makes the splitter aerodynamically less effective. Another factor limiting the device's aerodynamic effectiveness are government regulations which typically limit how much a front splitter may physically protrude beyond the perimeter of the bumper on a production street vehicle. Hence, the above limitations for a "street type" front splitter design will likely render it less effective for race track use.

Based on the foregoing, it would be desirable to provide a front splitter for a motor vehicle which can be conveniently re-configured for race track use with minimum effort.

SUMMARY OF THE INVENTION

The present invention is a splitter for mounting symmetrically about a motor vehicle centerline on the forward underside portion of the vehicle body to thereby direct the incoming airflow when the vehicle is in motion. According to the invention the splitter has a body panel with a rearward flexible segment for attachment to the vehicle body, and a forward more rigid segment having a leading edge contoured to define an elongated recess spaced symmetrically with respect to the vehicle centerline. The body panel additionally has an extended section on either side of the recess, arranged for selectively attaching thereto an extension strip of a desired width. The splitter has at least one pair of adjustable length linkages spaced symmetrically with respect to the vehicle centerline, each having a first end attached to the vehicle body and a second end attached to the body panel near the leading edge. The linkages are arranged to raise or lower the leading edge in response to adjustment of the linkages' length.

It should be understood that the detailed description and specific examples which follow, while indicating preferred embodiments of the invention, are intended for purposes of illustration only and are not intended to limit the scope of the invention.

BRIEF DESCRIPTION OF THE DRAWINGS

FIG. 4 is a sectional view taken along line 4-4 of FIG. 3.

FIG. 5 is a perspective view of the splitter shown with a "track" extension strip attached to the splitter's leading edge according to the invention.

FIG. 6 is a sectional view taken along line 6-6 of FIG. 5.

FIG. 7 is a plan view of the splitter shown with a "street" extension strip attached to the splitter's leading edge according to the invention.

FIG. 8 is a plan view of the splitter shown with a "track" extension strip attached to the splitter's leading edge according to the invention.

DETAILED DESCRIPTION

In general the present invention is directed to an aerodynamic front splitter for a motor vehicle. A particular application of the present invention is for an adjustable aerodynamic front splitter for a sports or competition type vehicle which also conforms to government regulations for street-driven motor vehicles. The term "adjustable" is used here to mean easily reconfigured, i.e. that the leading edge of the splitter can be changed from a configuration which is suitable for street use to one which is preferable for competition and race track use. Features capable of being adjusted according to the invention include the configuration of the splitter's leading edge as well as the height or position of the leading edge relative to the vehicle body to thereby direct the incoming air stream as desired for the intended use of the vehicle.

Figure 1:
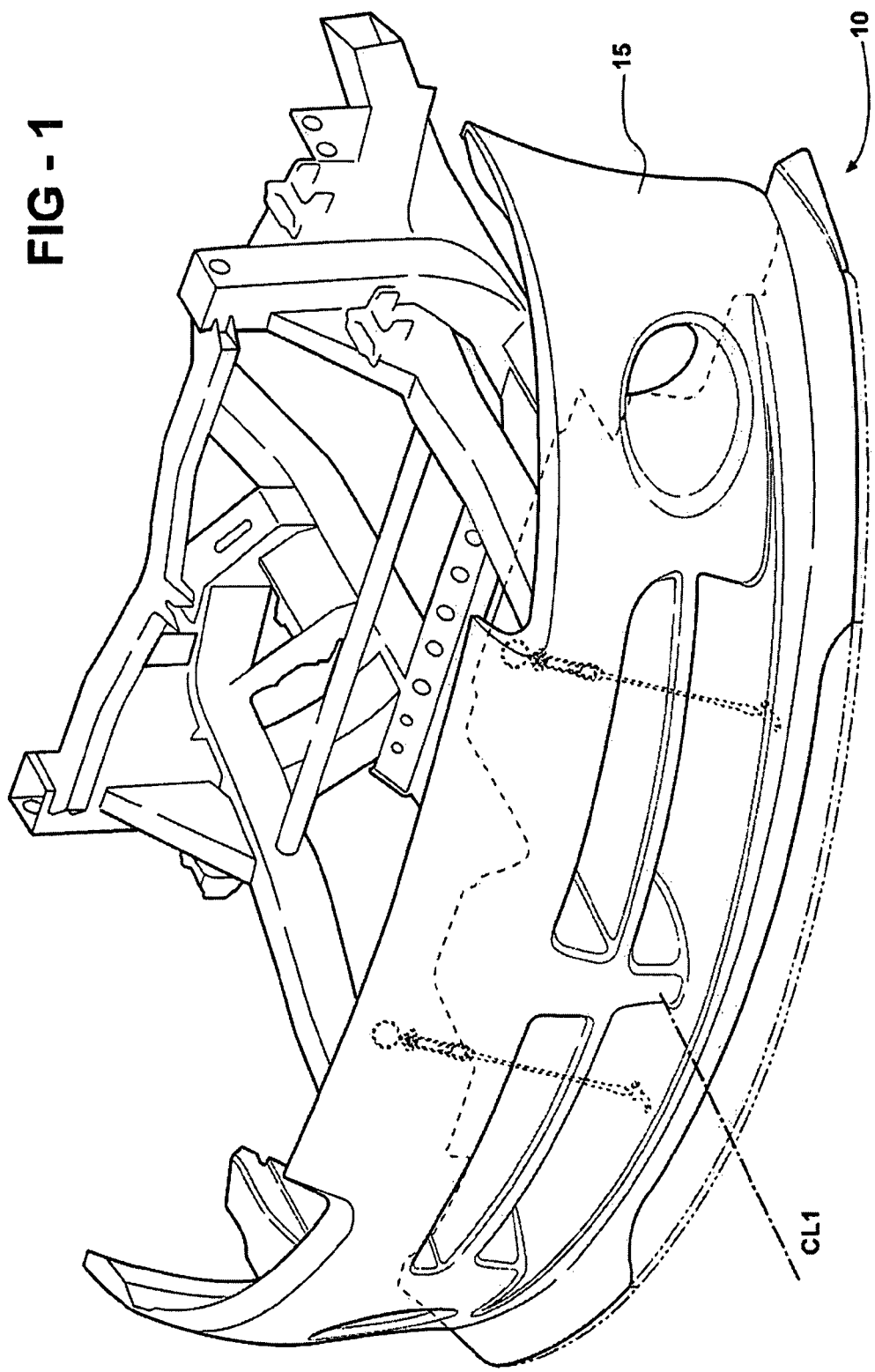
FIG. 1 is a perspective view of a forward portion of a vehicle body including a front fascia with a splitter shown in broken lines mounted thereto according to the invention ("track" extension shown).
Figure 2:
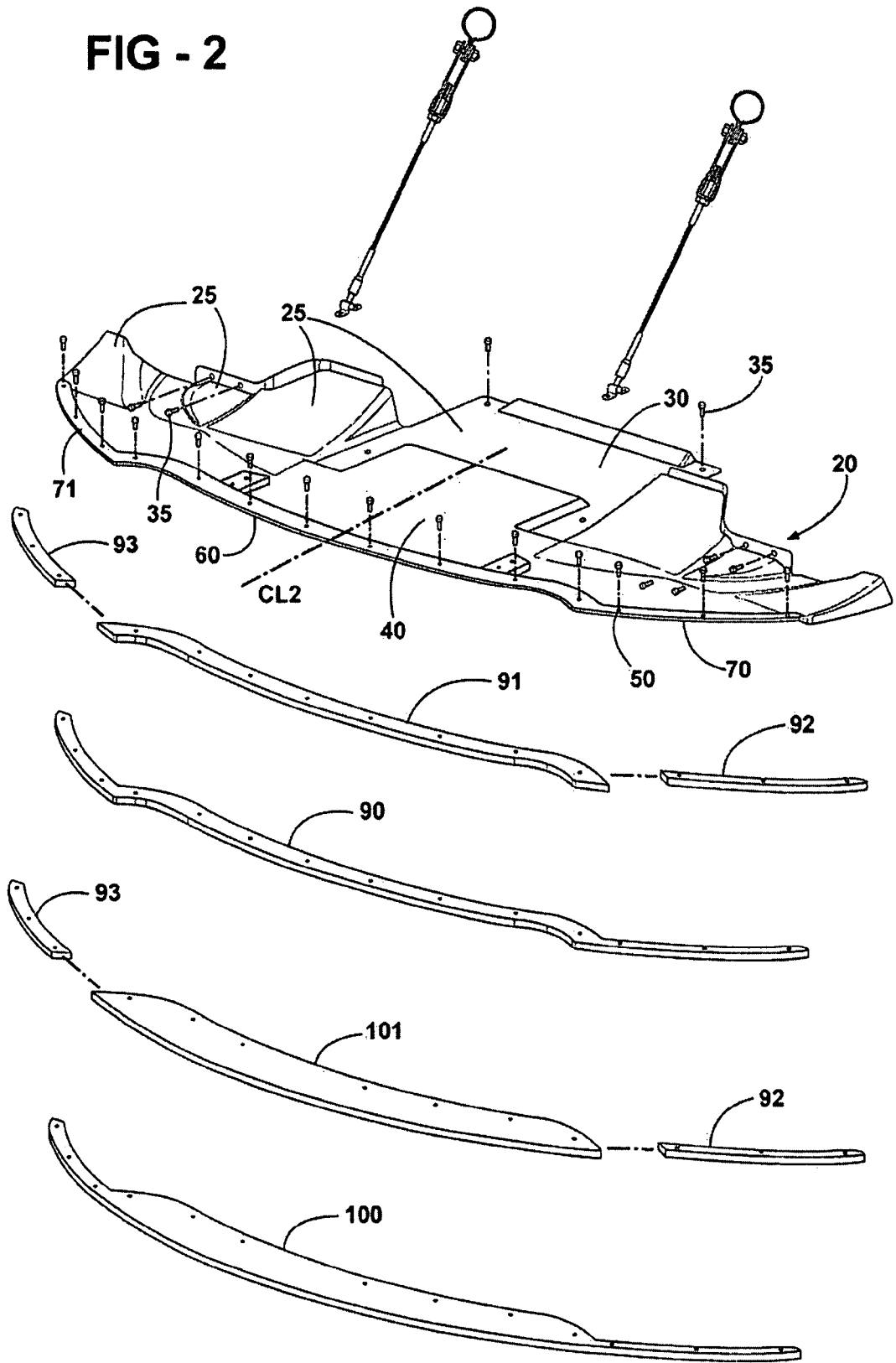
FIG. 2 is an exploded perspective view of the splitter components according to the invention.

Referring now to the drawings in which like elements of the invention are identified with identical reference numerals throughout, adjustable aerodynamic splitter 10 according to the present invention is best seen in FIGS. 1-8. FIG. 1 denotes a perspective view of a forward portion of a vehicle body 15 including a front fascia and the splitter 10 mounted on the forward portion of vehicle body (competition-type "track" extension shown). When splitter 10 is thus mounted, vehicle body centerline CL1 generally coincides with splitter centerline CL2. FIG. 2 represents an exploded perspective view of the splitter. Splitter 10 includes body panel 20 preferably made from a lightweight tough material which can be layered or laminated, such as carbon fiber or engineering plastic, to achieve desired thickness and rigidity for a particular panel section. Body panel 20 includes flexible rearward segment 30 and more rigid forward segment 40. Rearward segment 30 is arranged for attachment to vehicle body 15 with screws 35 as shown. Forward segment 40 includes leading edge 50 contoured to define an elongated recess 60 spaced symmetrically about body panel centerline CL2. Leading edge 50 is additionally contoured to define extended sections 70 and 71 positioned symmetrically on either side of recess 60. Sections 70 and 71 are typically mirror-images of each other. Leading edge 50 includes offset band 80 (FIGS. 4 and 6) on its underside surface for selectively attaching a replaceable narrow "street" extension strip 90 or a wider "track" extension strip 100 thereto with screws 35. Extension strip 90 may consist of three separate strips, first strip 91 for attaching to offset band 80 at recess 60, and two mirror-image strips, second strip 92 and third strip 93, for attaching to the offset band at extended sections 70 and 71. Extension strip 90 protects leading edge 50 of the body panel from abrasion which can result from contact with protruding irregularities in the road surface. Extension strip 90 therefore functions as a rub-strip, and is preferably made from an engineering plastic or rubber selected to resist abrasion and fracture.

Extension strip 100 is preferably made from a stiff, tough material, such as layered carbon fiber or engineering plastic. If extension strip 90 consists of three strips 91, 92 and 93, only first strip 91 must be replaced with extension strip 101 to achieve vehicle "track" configuration. Like extension strip 100, extension strip 101 is preferably made from a stiff, tough material, such as layered carbon fiber or engineering plastic. Both extension strips, 90 and 100, extend below leading edge bottom surface 55, thereby forming an offset 105, which is beneficial for abrasion capacity, i.e. allowing the extension strips to abrade longer, and for limiting front end lift. Extension strip 100 can increase vehicle front end downforce by as much as 100% as compared to extension strip 90.

Body panel 20 is shaped according to an empirically determined contour 25 when viewed from the front of the vehicle. Contour 25 is designed to promote laminar airflow along the underside of the forward portion of vehicle body 15 by diffusing airflow and reducing underside air pressure. Development of contour 25 may take place iteratively through computer program prediction/analysis and follow-up confirmation/testing in the wind tunnel using known techniques. The target of development being prevention of lift on the forward portion of vehicle body 15 coupled with minimal overall resultant drag on the vehicle body.

Two adjustable length linkages 110 are shown attached at first end 111 to the forward portion of vehicle body 15 spaced symmetrically with respect to vehicle body centerline CL1, and at second end 112 to forward segment 40 near leading edge 50 spaced symmetrically with respect to body panel centerline CL2. Generally, a pair of adjustable linkages as shown provides sufficient support for the splitter of the type contemplated. The adjustable length linkages include tension sections 120, made from either rigid rods or tension cables, and turnbuckles 130 for adjusting and securing the length of the linkages. Any other combinations of linkage components capable of achieving the same result can also be used. Lengthening adjustable linkages 110 allows rearward segment 30 to flex under the weight of the splitter, whereby leading edge 50 is lowered relative to the forward portion of vehicle body 15. Shortening linkages 110 correspondingly raises the leading edge. Lowering the leading edge as described and installing extension strip 100 or 101 results in restricting the entryway between splitter 10 and the road surface for the incoming air stream to the underside of the vehicle, and provides down force on the forward portion of vehicle body 15. Restricting the entryway for the incoming air stream in such manner increases down force on the forward portion of vehicle body 15. Additionally, having contour 25 preserving laminar underside airflow further limits the amount of lift that could result from a given stream of air.

Figure 3:
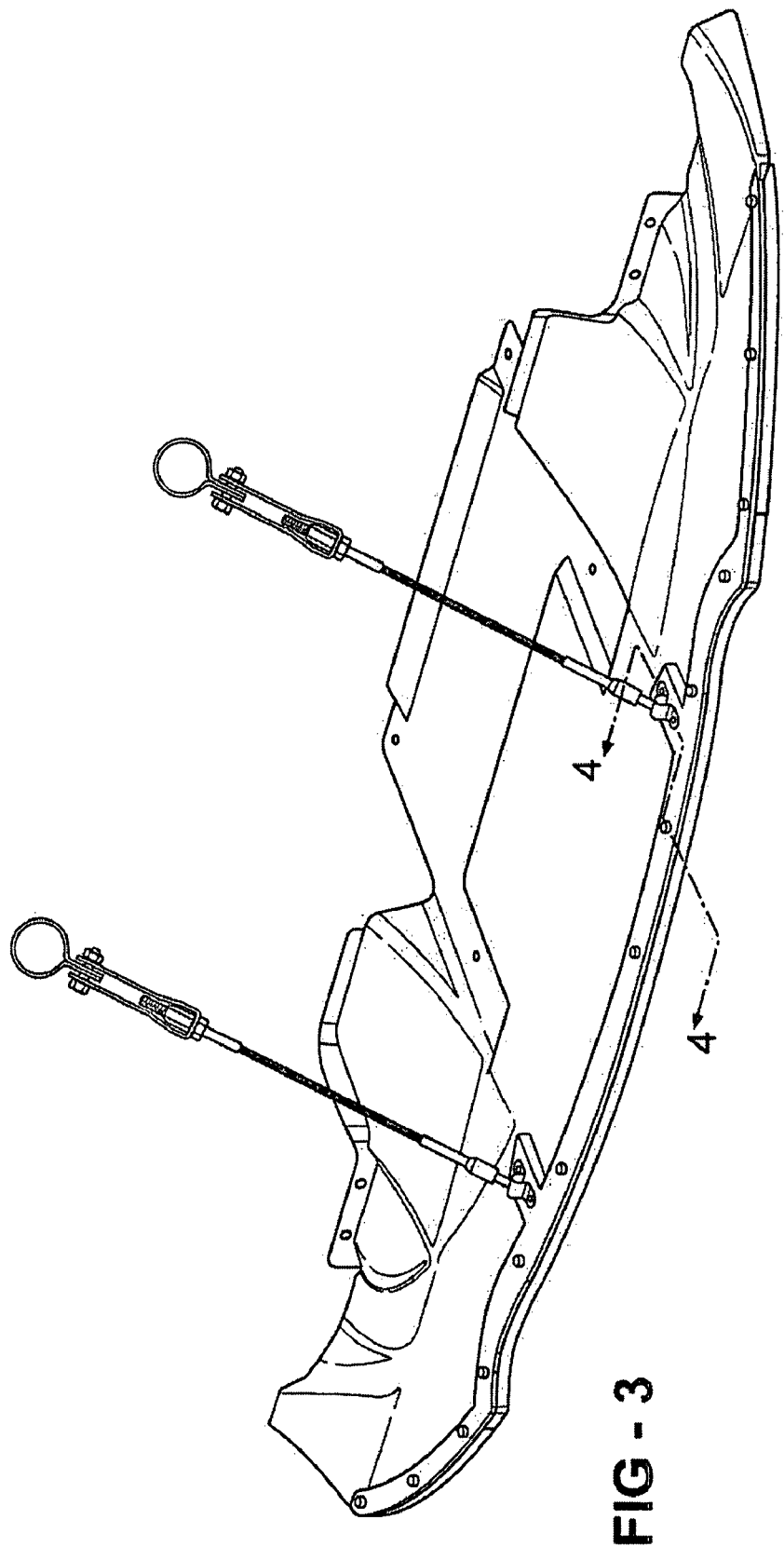
FIG. 3 is a perspective view of the splitter shown with a "street" extension strip attached to the splitter's leading edge according to the invention.

FIG. 3 denotes splitter 10 in "street" layout, with extension strip 90 attached, and FIG. 4 denotes the view taken along line 4-4 of FIG. 3. FIG. 5 denotes splitter 10 in "track" configuration, with extension strip 100 attached, and FIG. 6 denotes the view taken along line 6-6 of FIG. 5. As can be seen from FIGS. 4 and 6, extensions 90 and 100 may be attached to leading edge 50 via a lap joint and fastened with screws 35.

FIGS. 7 and 8 denote a plan view of splitter 10 as seen from the underside of vehicle front fascia. FIG. 7 denotes a plan view of splitter 10 in "street" configuration. FIG. 8 denotes a plan view of the splitter in "track" configuration, with extension 101 attached and replacing extension 91.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A splitter for mounting generally symmetrically about a motor vehicle centerline on the forward underside portion of the vehicle body for directing the incoming airflow when the vehicle is in motion, comprising:

a body panel having i) a rearward flexible segment for attachment to the vehicle body, and ii) a forward segment more rigid than the rearward segment and having a leading edge contoured to define an elongated recess spaced symmetrically with respect to the body panel centerline and an extended section on either side of the recess, the leading edge arranged for selectively attaching thereto an extension strip of a desired width; and at least two adjustable length linkages spaced symmetrically with respect to the panel centerline, each having a first end attached to the vehicle body and a second end attached to the body panel near the leading edge, and arranged to raise or lower the leading edge in response to adjustment of the length of the linkage.

2. The splitter of claim 1 further comprising an extension strip and wherein the leading edge includes an offset band for selectively attaching thereto the extension strip by a lap joint.

3. The splitter of claim 2 wherein the extension strip comprises a first part attached to the recess, and second and third parts attached to the extended sections.

4. The splitter of claim 2 wherein the extension strip comprises energy absorbing and compression resisting material.

5. The splitter of claim 2 wherein the extension strip extends below the bottom surface of the leading edge, thereby forming a step for abrasion capacity and for limiting lift on the forward portion of the vehicle-body.

6. The splitter of claim 1 wherein the body panel is a multi-layer laminate.

7. The splitter of claim 6 further comprising an extension strip and wherein an upper layer of the multi-layer laminate overlaps a lower layer at the leading edge thereby forming an offset band for selectively attaching thereto the extension strip by a lap joint.

8. The splitter of claim 1 wherein the body panel is comprised of carbon fiber.

9. The splitter of claim 1 wherein the rearward flexible segment is shaped according to an empirically determined contour when viewed from the front of the vehicle to provide laminar airflow along the forward underside portion of the vehicle by diffusing airflow and reducing underside air pressure.

10. The splitter of claim 1 wherein the at least two adjustable length linkages each comprise a threaded length connected by a turnbuckle.

11. A motor vehicle body having a splitter mounted generally symmetrically about the vehicle body centerline on the forward underside portion of the vehicle body for directing the incoming airflow when the vehicle is in motion, the splitter comprising:

a body panel having i) a rearward flexible segment for attachment to the vehicle body, and ii) a forward segment more rigid than the rearward segment and having a leading edge contoured to define an elongated recess spaced symmetrically about the vehicle centerline and an extended section on either side of the recess, the reading edge arranged for selectively attaching thereto an extension strip of a desired width; and at least two adjustable length linkages spaced symmetrically with respect to the panel centerline, each having a first end attached to the vehicle body and a second end attached to the body panel near the leading edge, and arranged to raise or lower the leading edge in response to adjustment of the length of the linkage.

12. The motor vehicle body of claim 11 further comprising an extension strip and wherein the leading edge includes an offset band for selectively attaching thereto the extension strip by a lap joint.

13. The motor vehicle body of claim 12 wherein the extension strip comprises a first part attached to the recess, and second and third parts attached to the extended sections.

14. The motor vehicle body of claim 12 wherein the extension strip comprises energy absorbing and compression resisting material.

15. The motor vehicle body of claim 12 wherein the extension strip extends below the bottom surface of the leading edge, thereby forming a step for abrasion capacity and for limiting lift on the forward portion of the vehicle body.

16. The motor vehicle body of claim 11 wherein the body panel is a multi-layer laminate.

17. The motor vehicle body of claim 16 further comprising an extension strip and wherein an upper layer of the multi-layer laminate overlaps a lower layer at the leading edge thereby forming an offset band for selectively attaching thereto the extension strip by a lap joint.

18. The motor vehicle body of claim 11 wherein the body panel is comprised of carbon fiber.

19. The motor vehicle body of claim 11 wherein the rearward flexible segment is shaped according to an empirically determined contour when viewed from the front of the vehicle to provide laminar airflow along the forward underside portion of the vehicle by diffusing airflow and reducing underside air pressure.

20. The motor vehicle body of claim 11 wherein the at least two adjustable length linkages each comprise a threaded length connected by a turnbuckle.

\* \* \* \* \*